Patented Jan. 13, 1942                                                     2,270,090

UNITED STATES PATENT OFFICE 2,270,090

MANUFACTURE OF CATALYSTS

Charles L. Thomas, Chicago, Ill., assignor to Universal Oil Products Company, Chicago, Ill., a corporation of Delaware No Drawing. Application June 17, 1939, Serial No. 279,687

4 Claims. (Cl. 252—250)

This invention relates to the manufacture of catalysts suitable for accelerating reactions among hydrocarbons. More specifically it has reference to a method of manufacturing refractory catalytic materials which are particularly effective in selectively promoting the formation of high anti-knock motor fuel from relatively heavy petroleum fractions, the preferred catalysts being prepared synthetically by definite steps of procedure which are specific in the production of catalytic materials of high activity for prolonged use.

The present invention is concerned with the manufacture of catalytic materials which are especially adapted to accelerate the cracking of heavy fractions of petroleum and other hydrocarbonaceous materials whereby motor fuel hydrocarbons are produced at milder conditions of temperature and pressure than in the pyrolytic cracking processes and with the formation of motor fuel of higher antiknock value. Gaseous by-products are concurrently produced containing high percentages of readily polymerizable olefins which are a potential source of further yields of motor fuel of correspondingly high antiknock value. These catalysts are characterized by their selectivity in accelerating motor-fuel forming reactions rather than light gas-forming reactions, by their selectivity in producing said high anti-knock motor fuel, by their porous and refractory condition which enables them to retain their catalytic properties under high temperature conditions of use and regeneration, by their ease and simplicity of manufacture and their exact reproducibility.

In one specific embodiment the present invention comprises the manufacture of catalytic material for use in hydrocarbon conversion reactions, more particularly in the conversion of hydrocarbon fractions containing substantially no motor fuel into substantial yields of motor fuel of high antiknock value producing concurrently gases containing relatively higher percentages of readily polymerizable olefins, by preparing under definitely controlled conditions in the primary step a precipitated, hydrated silica gel, water washing, drying until substantial dryness, water washing the dried silica until substantially free from alkali metal impurities, suspending the purified silica in a dilute solution of an aluminum salt and precipitating hydrous aluminum oxide in the presence of the suspended silica by the addition of an alkali metal free precipitant, filtering and drying, forming into particles, and calcining at temperatures within the approximate range of 1000–1500° F.

In general, the character and efficiency of the ultimately prepared catalyst will vary more or less with the exact conditions of precipitation and/or mixing, the purification treatment and in the case of silica-alumina catalyst with the ratio of the precipitated silica and precipitated alumina. In the catalysts thus prepared major proportions of precipitated silica and minor proportions of precipitated alumina are preferred, more than twice as much precipitated silica being generally employed as precipitated alumina, suitable catalysts having been obtained using approximately 5 to 30% of alumina with 70 to 95% by weight of precipitated silica. Generally speaking, the catalytic material is an amorphous mass resulting from the calcination of a blend of a precipitated silica hydrogel with one or more hydrous metal oxides. As in the case of silica-alumina catalyst, for example, the components indicate more or less low activity individually but when prepared, purified and composited as described, display high activity together with great heat stability. The activity is not an additive function, it being relatively constant for a wide range of proportions of the components whether in molecular or fractions of molecular proportions. No one component can be determined as the one component for which the remaining components may be considered as the promotor, nor can any component be determined as the support and the other, the catalyst proper. Inasmuch as the chemistry of the true solid state is very incompletely developed, it has not been determined how these materials are arranged within the catalyst.

According to a preferred method of preparation, the hydrated silica gel is prepared by acidifying an aqueous solution of sodium silicate by the addition of an acid such as hydrochloric acid, for example. The manner in which precipitation is brought about, the alkalinity used when the precipitation is nearly complete and the excess of acid subsequently added are carefully regulated in order that a suitable silica hydrogel is formed for subsequent processing and compositing with the remaining component. For example, when using commercial water glass containing approximately 8–9% $Na_2O$ and 28.5% $SiO_2$, dilutions of the order of 6 to 10 times have been used and the addition of acid has been stopped just before the neutral point to allow substantially complete formation of the gel before adding a slight excess of acid and then neutralizing the excess.

The silica gel is then treated to remove alkali metal impurities. It is not known if the alkali metal ions such as sodium ions are present in the primary gel in chemical combination or in an absorbed state but it has been definitely determined that their removal is necessary if catalysts suitable for prolonged use in accelerating hydrocarbon conversion reactions are to be obtained. It appears that the presence of alkali metal impurities brings about a sintering or fusion of the catalyst at elevated temperatures so that the porosity is much reduced with corresponding reduction in effective catalyst surface. In the present invention alkali metal impurities remaining in the silica gel are removed by drying the precipitated silica gel whereby its volume is considerably reduced and it is rendered into a suitable physical condition so that the alkali metal impurities are readily removed by water washing treatment.

Purified hydrated silica prepared in the above manner is suitable for compositing with one or more hydrous metal oxides to form catalysts suitable for prolonged use in hydrocarbon conversion reactions. Thus catalysts suitable for cracking may be prepared by admixing the purified hydrated silica with hydrous oxides such as alumina, zirconia, alumina and zirconia, or alumina and thoria, for example. Likewise in the preparation of dehydrogenating catalysts the various hydrous oxides effective in dehydrogenation reactions may be composited with the purified hydrated silica according to the process of the present invention.

In one of the preferred methods of compositing the components, the purified hydrated silica is suspended in a solution of an aluminum salt, for example, in the desired proportion and hydrous alumina deposited upon the suspended hydrated silica by the addition of alkali metal-free precipitants such as ammonium hydroxide or other suitable ammonium compounds. Alternatively, although not with equivalent results, the purified hydrated silica may be mixed while in the wet condition with separately precipitated hydrous alumina precipitated for example as described above. After the hydrous alumina has been admixed with the purified hydrated silica, it is directed to a filter such as a filter press or centrifuge, for example, and preferably give a water wash. The filter cake is then dried and broken down to a uniform powder for consolidating under pressure into sized particles or pellets of the desired dimensions. The formed particles are then calcined at temperatures of approximately 1000–1500° F. for one to several hours whereby stabilized catalyst particles are obtained suitable for prolonged service under commercial conditions of use and regeneration.

Catalysts prepared by the above general procedure possess a large total contact surface corresponding to very high porosity, the pores being of such form and size that hydrocarbon oil vapors are able to penetrate to a considerable depth and yet not so small that they are difficult to reactivate by oxidation when the pores become clogged with carbonaceous deposits in service. The structure is also retained after many alternate periods of use and reactivation as evidenced by the fact that the catalyst may be repeatedly reactivated by passing oxygen containing gas over the spent particles to burn off deposits of carbonaceous material at temperatures as high as 1400° F. without material loss of catalytic activity.

Catalysts prepared by the general procedure described above are utilized as filling material in tubes or chambers in the hydrocarbon conversion reactions. For example, hydrocarbon fractions readily vaporizable at moderate temperatures without extensive decomposition are contacted with the catalysts above described using particles of a range of approximately 2–8 mesh. The general procedure in cracking, for example, involves contacting the heated hydrocarbonaceous material with the catalyst and subsequent fractionation steps involving separation of residuum and/or insufficiently converted hydrocarbons which may be returned to contact with the catalyst for further conversion treatment. The products are separated into motor fuel of the desired boiling point range and normally gaseous fractions which may be subjected to polymerizing treatment to convert readily polymerizable olefins present in the gaseous fractions into additional yields of the desired high antiknock motor fuel. The reactions and products that may be obtained in the presence of these catalysts are not known to result from strictly thermal treatment.

The following example of a catalyst characterized in the present invention is given to indicate the novelty and utility of the process although not for the purpose of limiting the invention in exact agreement with the data introduced.

As a specific example a silica-alumina catalyst was prepared having the following approximate ratio: $100SiO_2:6Al_2O_3$. One volume of commercial water glass containing 8.9 percent $Na_2O$ and 28.5 percent $SiO_2$ was diluted to approximately 10 volumes with water and concentrated hydrochloric acid, diluted with an equal volume of water was added while agitating the solution until a pH of approximately 8½ was obtained. A slight excess of acid subsequently was added and the excess acid neutralized whereby complete precipitation of the silica was obtained and the gel would filter without difficulty. This gel was water washed until the final washings were sodium and chloride free. The gel was then dried at 230–250° F. until substantially dry. The dried material was readily reduced to a powdered condition whereupon it was water washed to substantially remove sodium compounds liberated as a result of the drying treatment. Washed precipitate equivalent in amount to 125 parts of $SiO_2$ was suspended and agitated in a solution containing 60 parts by weight of $AlCl_3.6H_2O$, and 230 parts of 5 normal ammonium hydroxide was gradually added to precipitated hydrous alumina in the presence of the suspended purified hydrated silica. The composited precipitate was then further water washed, filtered and dried using a temperature of 250–300° F. The dried catalytic material was crushed to pass approximately 60 mesh screen and pelleted to form 1/8 inch pellets. The pellets were calcined at a temperature of approximately 1500° F. for two hours.

Particles of the above described catalyst were disposed in a chamber and 37.6° A. P. I. Pennsylvania gas oil vaporized and processed in contact with the catalyst at a temperature of 932° F. and substantially atmospheric pressure using a liquid hourly space velocity of four. 35 percent of 400° F. end-point gasoline having 79 octane number was produced in the operation. In order to test the heat stability of this catalyst it was heated for six hours at a temperature of 1650° F. and again contacted with hydrocarbon vapors. The yield and character of the gasoline produced was exactly the same as before the heat treatment indicating that the catalyst has been satisfactorily treated to remove alkali metal impurities and will have prolonged activity when cracking hydrocarbon vapors in commercial service where the catalyst is used and regenerated a large number of times.

I claim as my invention:

1. A process for the manufacture of catalytic material suitable for accelerating hydrocarbon conversion reactions which comprises precipitating a silica hydrogel from a solution of an alkali metal silicate by the acidification thereof, water washing the hydrogel until the wash water is substantially free of alkali metal ions, then heating the hydrogel at above the boiling point of water until substantial dryness, thereby liberating additional alkali metal impurities, water washing the dried material to substantially remove said additional alkali metal impurities, and suspending the washed hydrated silica in a solution of a salt of a metal selected from the group consisting of aluminum, zirconium, and thorium, precipitating hydrous oxide from the solution by the addition of an alkali metal free basic precipitant, washing and drying, forming particles of definite size and calcining at a temperature of approximately 1000-1500° F.

2. A process for the manufacture of catalytic material suitable for accelerating hydrocarbon conversion reactions which comprises precipitating a silica hydrogel from a solution of an alkali metal silicate by the acidification thereof, water washing the hydrogel until the wash water is substantially free of alkali metal ions, then heating the hydrogel at above the boiling point of water until substantial dryness, thereby liberating additional alkali metal impurities, water washing the dried material to substantially remove said additional alkali metal impurities, suspending the purified hydrated silica in a solution of an aluminum salt, precipitating hydrated alumina by the addition of an alkali metal free basic precipitant, filtering and washing, forming into particles of definite size and calcining at a temperature of approximately 1000-1500° F.

3. A process for the manufacture of catalytic material suitable for accelerating hydrocarbon conversion reactions which comprises precipitating a silica hydrogel from a solution of an alkali metal silicate by the acidification thereof, water washing the hydrogel until the wash water is substantially free of alkali metal ions, then heating the hydrogel at above the boiling point of water until substantial dryness, thereby liberating additional alkali metal impurities, water washing the dried material to substantially remove said additional alkali metal impurities, suspending the purified hydrated silica in a solution of a zirconium salt, precipitating hydrated zirconia by the addition of an alkali metal free basic precipitant, filtering and washing, forming into particles of definite size and calcining at a temperature of approximately 1000-1500° F.

4. A process for the manufacture of catalytic material suitable for accelerating hydrocarbon conversion reactions which comprises precipitating a silica hydrogel from a solution of an alkali metal silicate by the acidification thereof, water washing the hydrogel until the wash water is substantially free of alkali metal ions, then heating the hydrogel at above the boiling point of water until substantial dryness, thereby liberating additional alkali metal impurities, water washing the dried material to substantially remove said additional alkali metal impurities, suspending the purified hydrated silica in a solution of salts of aluminum and zirconium, precipitating hydrated alumina and hydrated zirconia by the addition of an alkali metal free basic precipitant, filtering and washing, forming into particles of definite size and calcining at a temperature of approximately 1000-1500° F.

CHARLES L. THOMAS.